United States Patent Office 3,138,603
Patented June 23, 1964

3,138,603
NEW BENZOMORPHANS (METHANOBENZAZO-
CINES) AND PREPARATION THEREOF
Everette L. May, Bethesda, Md., assignor to the United
States of America as represented by the Secretary of
the Department of Health, Education, and Welfare
No Drawing. Filed Oct. 31, 1958, Ser. No. 771,165
12 Claims. (Cl. 260—294.3)
(Granted under Title 35, U.S. Code (1952), sec. 266)

The present invention relates to benzomorphans and the preparation thereof, and aims generally to provide new and useful materials and processes in this field. Certain aspects of the invention have been disclosed in an article by the applicant and a co-worker in the Journal of Organic Chemistry, 22, 1366, published November 12, 1957, within one year prior to the filing of the present application, which disclosure is incorporated herein by reference. Systematically, these benzomorphans may be termed methanobenzazocines, or more specifically 2,6-methano-3-benzazocines.

Objects of the invention include, severally and interdependently, but are not limited to, the preparation of new benzomorphan derivatives, including derivatives useful as intermediates in the preparation of further derivatives, and useful in certain instances in the investigation of the physiological utility of various moieties and substituent groups in such compounds, the provision of new benzomorphan derivatives characterized by new moieties and new combinations of substituent groups therewith, and the provision of such materials as racemates, as separated optical isomers, and as separated diastereoisomers.

The invention resides in the new processes and products herein set forth and is more particularly pointed out in the appended claims. Certain products of this invention have been discovered to show superior analgesic and tranquilizing powers of a potentially medically useful type and there is evidence that they may have less addiction potential and toxicity than presently-used pain-relieving drugs, as well as other advantages including possible oral effectiveness.

The new compounds made available by the present invention may be represented by the following structural formula:

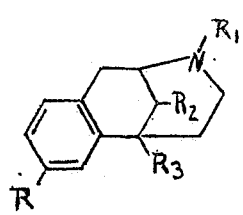

wherein R is a member selected from the group consisting of hydrogen and the hydroxy, alkoxy and acyloxy radicals; $R_1$ is a member selected from the group consisting of hydrogen, methyl, straight chain alkyl, and aralkyl radicals; $R_2$ is a member selected from the group consisting of hydrogen, alkyl, methylene and substituted methylene radicals; and $R_3$ is a member selected from the group consisting of hydrogen and the alkyl radicals—and especially compounds of such formula wherein the alkyl portions of the said members contain from 1 to 4 carbon atoms, with the limitation that when $R_2$ is hydrogen R is other than hydrogen. In the systematic terminology, the basic nucleus of these compounds may be named 1,2,3,4,5,6-hexahydro-2,6-methano-3-benzazocine; and the new compounds may be correspondingly named with R designated in the 8-position of $R_1$, $R_2$, and $R_3$ designated in the 3,11 and 6-positions of the thus numbered nucleus respectively. Certain of the new compounds have also been given specific names by the World Health Organization as noted in the Official Gazette of the U.S. Patent Office, vol. 751, page 1, February 2, 1960, namely: (1) the 1,2,3,4,5,6-hexahydro-8-hydroxy-3,6,11-trimethyl-2,6 - methano - 3-benzazocine is given the international non-proprietary names "metazocinum" and "metazocine," and (2) the 1,2,3,4,5,6-hexahydro-8-hydroxy-6,11-dimethyl-3-phenethyl-2,6-methano - 3 - benzazocine the corresponding names "Phenazocinum" and "Phenazocine."

The new compounds as first isolated are racemic, and optical resolution of typical ones thereof (IVc and VI) is herein disclosed. As shown in said copending application, screening and other tests evidence that virtually all of the neuropharmacologic activity is due in each instance to the levo-antipode, while the dextro isomers show low activity and in one instance (IVc) higher acute toxicity.

The synthesis principally employed for the parent (new) benzomorphans involves condensation reaction of a benzyl Grignard reagent, e.g. benzylmagnesium chloride (Ia) or the p-methoxy derivative thereof (Ib), with a 3,4-dialkylpyridine alkyl halide, e.g. 3,4-lutidine methiodide, to give dihydro bases (II). The latter are hydrogenated selectively to tetrahydro derivatives (III) which upon treatment, as with either 48% hydrobromic acid or 85% phosphoric acid, are cyclized to the benzomorphans (IV), O-demethylation occurring simultaneously in the case of IIIb to produce 2'-hydroxy-2,5,9-trimethyl-6,7-benzomorphan (IVc) and a diastereoisomer differing at $C_9$ (which diastereoisomer is shown in said copending application to be analgesically more potent than the principal racemate). Regarding the principal racemate as the "normal" series, the analgesically more potent diasterioisomer (minor racemate) may be designated by the term "iso." The iso and normal racemates, as shown by Examples 1 and 2 hereinafter, differ in melting points and solubilities and are separable by fractional crystallization. The synthesis just described may be applied to produce N-substituted and C-substituted homologs of IV by using other 3,4-dialkylpyridine alkiodides as starting materials.

In an improved process also herein disclosed, IVc is converted to N-substituted (alkyl or 2-phenethyl) analogs by protecting the hydroxy, as by substituting for its hydrogen a methyl or acetyl group, N-dealkylating with cyanogen bromide-hydrolysis, acylating the resulting secondary amines and reducing the amides formed with lithium aluminum hydride. A typical example of this conversion is shown in the preparation of 2'-hydroxy-5,9-dimethyl-2-phenethyl-6,7-benzomorphan (VI).

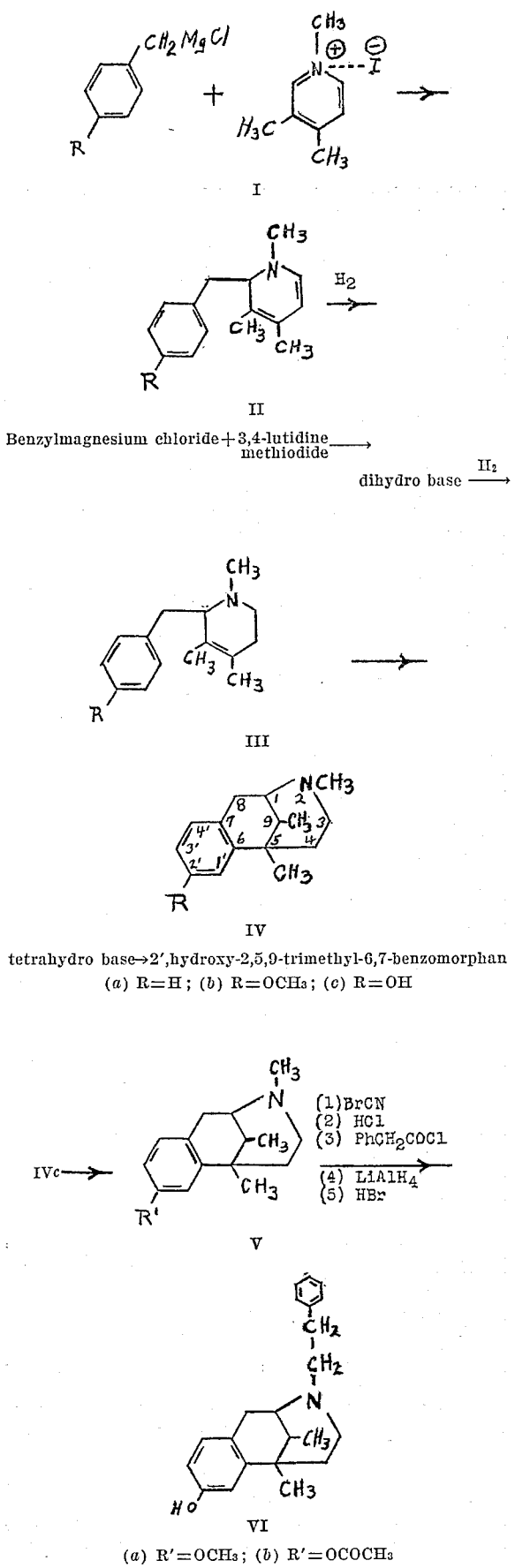

Benzylmagnesium chloride + 3,4-lutidine methiodide → II dihydro base $\xrightarrow{H_2}$ tetrahydro base → 2',hydroxy-2,5,9-trimethyl-6,7-benzomorphan (a) R=H; (b) R=OCH₃; (c) R=OH (a) R'=OCH₃; (b) R'=OCOCH₃

Compound IVa, 2,5,9-trimethyl-6,7-benzomorphan, has also been prepared by an alternative synthesis from the bicyclic ketone methobromide (VII), a known compound obtained from β-tetralone, by the scheme outlined below. This alternative synthesis of IVa is potentially useful for preparing homologs of IVa and IVc at the 2,5 and 9 positions, and for the aforementioned disastereoisomer of IVc.

While the reactions used here are standard, the sequence employed is believed to constitute a novel process.

The constitution of the basic benzomorphan molecule (IV) was proved by the degradation of 2,5,9-trimethyl-6,7-benzomorphan (IVa) to a known compound (1,2-dimethylnaphthalene), a proof strengthened by the fact that IVa was synthesized by totally different sequences as shown above. Furthermore IVa was transformed into IVc via nitration, hydrogenation and the diazotization reaction. The latter (IVc) and the diastereoisomer were each converted to 7-methoxy-1,2-dimethylnaphthalene.

The foregoing and other aspects, objects, and advantages of the invention will be evident to those skilled in the art from the following examples, in which Examples 1 and 3 illustrate the first synthesis above described; Example 2 the isolation of the diastereoisomer; Example 4 the second or alternative synthesis above described; Examples 5 and 6 the conversion to new N-alkyl or N-aralkyl analogs; Example 7 the resolution of the principal racemate into the optical isomers; and Examples 8 and 9 the conversion of the separated optical isomers to new analogs; and it will be understood that these examples are illustrative and not restrictive of the invention, the scope of which is more particularly pointed out in the appended claims.

EXAMPLE 1

A stirred suspension of 50 g. of 3,4-lutidine methiodide and 75 ml. of dry ether was treated during 15–20 minutes with 700 ml. of 0.3–0.35 M ethereal p-methoxybenzylmagnesium chloride (I). The mixture was stirred for an additional 60–90 minutes and poured with vigorous stirring into 250 ml. of ice-water containing 50 g. of ammonium chloride. After addition of 10–15 ml. of concentrated ammonium hydroxide, the ether layer was extracted 3–4 times with a total of 250 ml. of 2 N hydrochloric acid. The combined extracts were basified with ice-ammonium hydroxide and the liberated base was extracted with 250 ml. of ether in 4 portions. The combined extracts were dried over sodium sulfate and the ether evaporated at the water pump.

The resultant 42–45 g. of oil (IIb) was dissolved quickly in 200 ml. of ice-cold N HCl and the solution shaken under hydrogen with 8 g. of 5% palladium barium sulfate (carrier). After 10–15 hours 0.8–0.9 molar equivalent of hydrogen had been absorbed and reaction had almost ceased. The mixture was then filtered through Filter-Cel and basified with ice-cold ammonium hydroxide. The liberated material was shaken into ether (three extractions). The combined dried extracts were distilled, the residue at a bath temperature of 125–140°/0.1–0.5 mm. to give 20–24 g. of tetrahydro base (IIIb).

This tetrahydro base (IIIb), with 175 ml. of 48% hydrobromic acid, was kept at 135–140° for 20–25 hours. The resultant solution was poured into ice-water and basified with concentrated ammonium hydroxide. Extraction with 250–300 ml. of chloroform in 3–4 portions followed by drying and evaporation of the chloroform gave an oily residue which crystallized on trituration with 25 ml. of cold methanol. After 10–20 hours at −5° the yield of 2′-hydroxy-2,5,9-trimethyl-6,7-benzomorphan (IVc) was 10–12.5 g.; M.P. 228–233°. The analytical sample melted at 233–236° while the hydrochloride salt (monohydrated) melted at 194–196°.

EXAMPLE 2

Distillation of the methanol from the filtrates of two 50-g. runs of Example 1 left a residue which was distilled at a bath temperature of 175–200° (0.5 mm.). Fractional crystallization of the distillate from methanol and acetone gave ultimately 0.8 g. of the hydrochloride of a diastereoisomer of IVc, M.P. 269–271°. The base melted at 215–217°.

EXAMPLE 3

To a stirred suspension of 12 g. of 3.4-lutidine methiodide and 100 ml. of dry ether (cooled in ice-water) was added during 5 minutes, 100 ml. of 0.5 M ethereal benzylmagnesium chloride (I). The mixture was stirred without cooling for 1.5 hours and the dihydro base (IIa) isolated as described above, then evaporatively distilled at a bath temperature of 125° (0.5 mm.).

The distillate (5.8 g.) was hydrogenated as described above to give 3.8 g. of distilled tetrahydro base (IIIa).

The tetrahydro base (IIIa) and 38 g. of 85% phosphoric acid were kept at 145–150° for 2.5 days, cooled, poured into ice and made alkaline with ammonium hydroxide. The resultant oil was dried in ether and distilled (125°/0.5 mm.) to give 3.3 g. of oil which was dissolved in 50 ml. of ethylacetate and acidified to Congo Red with gaseous hydrogen chloride. On seeding (seed obtained by manipulations with solvents, drying, scratching, etc., of an aliquot part) 2.5 g. of 2,5,9-trimethyl-6,7-benzomorphan hydrochloride (IVa), M.P. 167–170°, eventually separated. The picrate melted at 122–123° then at 114–115° after a recrystallization from alcohol.

EXAMPLE 4

To 11.2 g. of 2,5-dimethyl-9-oxo-6,7-benzomorphan methobromide (VII) was added 170 ml. (5 molar equivalents) of 1.0 M ethereal methylmagnesium bromide. The ether was distilled until the liquid adduct became much more fluid. The magma was then manually manipulated with a stirring rod until all solid passed into the fluid state. The mixture was decomposed with water and the solids were dissolved in 30 ml. of 6 N hydrochloric acid. Excess aqueous potassium iodide was added with the formation of the crystalline methiodide. Purified from alcohol it melted at 247–249°; yield 9.4 g.

A distilling flask containing 5.9 g. of this methiodide was kept in a salt bath at 275–280° under a pressure of 0.1–0.4 mm. The solid decomposed to an oil (tertiary alcohol) which distilled in a yield of 3.6 g., B.P. 112–115°/0.5 mm. This tertiary alcohol, 7 ml. of acetic anhydride and 0.7 ml. of pyridine were refluxed for 3 hours. Excess reagent was removed at reduced pressure and the product was distilled at ca. 122°/0.1 mm. (M.P. of perchlorate, from alcohol, 265–267°).

The distillate (2.8 g.) in a distilling flask, immersed in a salt bath at 325–340°, lost acetic acid during 30 minutes. The pressure was then reduced to 0.2 mm. with distillation of the product at 95–110° yielding the 9-methylene derivative. Dissolved in ether, this derivative was converted to the crystalline perchlorate with 60% perchloric acid, giving 1.2 g. of crude perchlorate, M.P. 204–219°.

This perchlorate (0.3 g.) in alcohol with platinum oxide absorbed one molar equivalent of hydrogen. The filtered solution gave 0.2 g. of a perchlorate of M.P. 201–210°. It was converted to the base (alkali-ether) which in acetone gave a methiodide, M.P. 225–226.5°, after a recrystallization from alcohol-ethyl acetate, identical in every respect to the methiodide prepared from the 2,5,9-trimethyl-6,7-benzomorphan (IVc) synthesized as described in Example 3.

EXAMPLE 5

A mixture of 1.5 g. of 2′-hydroxy-2,5,9-trimethyl-6,7-benzomorphan (IVc), 15 ml. of methanol and 25 ml. of 3% ethereal diazomethane were magnetically stirred for 4–5 hours. Another 25-ml. portion of the ethereal diazomethane was then added and the clear, yellow solution left at 25° for 3 days. Evaporation of solvents at reduced pressure and evaporative distillation of the residue at 125°/1 mm. gave 1.4 g. of methyl ether (Va) (M.P. of hydrobromide 233–235°).

This base in 12 ml. of chloroform was added (stirring) during one hour to 0.7 g. of cyanogen bromide in 5 ml. of chloroform. The solution was refluxed for 3 hours and evaporated to dryness in vacuo. To the residue was added 30 ml. of 6% hydrochloric acid and the mixture was refluxed 10–15 hours. After cooling and making alkaline with ammonium hydroxide, the base was shaken into chloroform. Drying and evaporation of the chloroform left 1.3 g. of oil.

This oil, 20 ml. of methanol, 7 ml. of water and 0.8 g. of potassium carbonate were stirred and treated during 10 minutes with 1.0 ml. of phenylacetyl chloride. The mixture was stirred 2–3 hours, diluted to 100 ml. with water and extracted thrice with ether. The combined ether extracts were washed with dilute hydrochloric acid, then water, dried and evaporated leaving 1.8 g. of crude amide.

This crude amide was dissolved in 10 ml. of dry ether and treated gradually with 17 ml. of 1.5 M ethereal lithium aluminum hydride. The mixture was refluxed overnight, decomposed carefully with 5–8 ml. of water and filtered. The dried ether filtrate was evaporated to dryness leaving 1.8 g. of crude base which in acetone-ether was converted to 1.2 g. of 2′-methoxy-5,9-dimethyl-2-phenethyl-6,7-benzomorphan hydrobromide with 33% hydrogen bromide in acetic acid; M.P. 242–244°.

This hydrobromide (1.3 g.) and 10 ml. of 48% hydrobromic acid were refluxed vigorously for 20 minutes, cooled in ice and decanted. The residue was dried at 60° in vacuo, dissolved in 4 ml. of acetone and the solution evaporated to dryness. The residue crystallized from 4 ml. of acetone. After 24 hours at −5° the yield of 2′-hydroxy - 5,9 - dimethyl - 2 - phenethyl - 6,7 - benzomorphan (VI) hydrobromide was 1.0 g.; M.P. 165–168°. The free base (from methanol-aqueous ammonia) melted at 180–181°.

EXAMPLE 6

2′-hydroxy-2,5,9-trimethyl-6,7-benzomorphan (IVc, 10 g.) and 10 ml. of acetic anhydride were kept on the steam bath for 30–45 minutes, cooled and poured into ice water. After 5 minutes the mixture was made alkaline (while keeping ice-cold) with 50% potassium hydroxide solution. The freed base was quickly shaken into ether and dried over sodium sulfate. Evaporation of the ether left 11.5 g. of O-acetyl derivative which was converted to 8.8 g. of crude 2′-hydroxy-5,9-dimethyl-6,7-benzomorphan by cyanogen bromide treatment and acid hydrolysis as described in Example 5 except that 2:1 butanol-benzene was used as the extraction solvent.

This 8.8 g. of secondary amine, 100 ml. of methanol, 15–20 ml. of water and 10 g. of potassium carbonate were stirred and treated during 15 minutes with 10 ml. of phenylacetyl chloride. After an additional 3 hours, 300 ml. of water was added and the mixture was extracted thrice with butanol-benzene. The combined extracts were washed with dilute hydrochloric acid, then water, dried and taken to dryness in vacuo.

The residue (12 g.) and 100 ml. of dry ether were stirred while adding dropwise 60 ml. of 1.5 M ethereal lithium aluminum hydride. The mixture was refluxed overnight, cooled in ice and treated carefully with 60 ml. of 48% hydrobromic acid. Addition of an equal volume of water, filtration, washing with cold water then ether, and drying the precipitate gave 10.5–12 g. of crude hydrobromide of VI which crystallized from 11 ml. of acetone and 10 ml. of ethyl acetate in a yield of 7 g., M.P. 166–170°.

EXAMPLE 7

A mixture of 4.4 g. of the hydrochloride salt of 2'-hydroxy-2,5,9-trimethyl-6,7-benzomorphan (IVc), 5.0 g. of the ammonium salt of (+)-α-bromocamphor-II-sulfonic and 35 ml. of water were warmed to solution, and kept warm until crystals began separating. After 2 hours at 25° and 3 hours at 5° the yield of precipitate, M.P. 225–270°, was 6.3 g. This precipitate was dissolved in 200 ml. of boiling water, and this solution was concentrated to 150 ml. and cooled at 5° overnight to give 3.8 g. of sulfonate salt, M.P. 285–288° (dec.). This in 150 ml. of the hot water gave, with addition of ammonium hydroxide, 1.5 g. of (−)-2'-hydroxy-2,5,9-trimethyl-6,7-benzomorphan, M.P. 182–184°. The analytical sample (from aqueous alcohol) had M.P. 183–184.5° and $[\alpha]_D^{20}$ −84.4° (c. 0.92, abs. alcohol). The hydrobromide salt crystallized from alcohol-ether; M.P. 238–241° $[\alpha]_D^{20}$ −52.0° (c. 2.00, water).

Ammonium hydroxide addition to the combined aqueous filtrates above gave 1.7 g. of a mixture of (±)- and (+)-bases which, by fractional crystallization from aqueous alcohol, gave 0.36 g. of (±)-IVc and 1.1 g. of (+)-2'-hydroxy-2,5,9-trimethyl-6,7-benzomorphan, M.P. 181–183°. The analytical sample melted at 183–184.5°; $[\alpha]_D^{20}$ +84.3° (c. 0.83, abs. alcohol), hydrobromide salt, M.P. 283–242° $[\alpha]_D^{20}$ +52.1 (c. 1.46, water).

EXAMPLES 8 AND 9

By the procedures described in Example 5, the levo- and dextro-isomers corresponding to 2'-hydroxy-2,5,9-trimethyl-6,7-benzomorphan (IVc) (see Example 7) were converted respectively to the (−)-2'-hydroxy-5,9-dimethyl-2-phenethyl-6,7-benzomorphan (VI) hydrobromide, M.P. 284–287°, $[\alpha]_D^{20}$ −84.1° (c. 0.82, 95% ethanol) and to the (+)-VI hydrobromide, M.P. 284–287°, $[\alpha]_D^{20}$ +84.4° (c. 1.47, 95% ethanol). The (−)-VI (base) melted at 159–159.5° and had $[\alpha]_D^{20}$ −121.6° (c. 0.74, 95% ethanol) and the (−)-VI (base) melted at 159–160°; $[\alpha]_D^{20}$ +120° (c. 0.60, 95% methanol).

It is clear from the above examples that a wide variety of O-, N- and C-substituted analogs of IVc are made available by the present invention which are useful as intermediates and certain of which, have been shown to have useful medical properties particularly of a neuropharmacologic nature, by animal and clinical tests as follows:

The benzomorphans forming the subject matter of the present invention which have been evaluated by the animal tests include those corresponding to the Formula VIII:

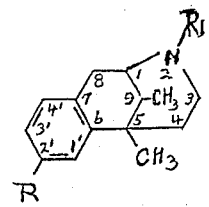

wherein R is a member selected from the group consisting of hydrogen, hydroxy and methoxy and $R_1$ is a member selected from the group consisting of methyl and phenethyl, $R_1$ being methyl when R is other than hydroxyl. Similar evaluation by animal screening of compounds according to the above formula wherein R is hydroxyl and $R_1$ is hydrogen or a $C_2$–$C_4$ straight chain alkyl, have shown such to be inactive at sub-toxic doses.

The benzomorphans which have been evaluated clinically at the time of the filing of the present application are limited to the phenethyl species of the above group (Formula VIII: R=OH, $R_1$=$CH_2CH_2Ph$).

The benzomorphans corresponding to the above general formula are preferably administered in the form of their salts with acids such as tartaric, citric, acetic, sulfuric, phosphoric, the halogen acids, etc.; the hydrobromide and hydrochloride salts being especially suitable. It is considered that the acids used to form salts of the drugs in question do not alter the pharmacological behavior of the drugs and in effect are relatively inert substituents which merely alter the solubility of the drugs, and unqualified reference to the benzomorphans per se, in the appended claims, is to be considered to apply thereto in salt form as well as in the form of the free base. It will be understood, of course, that the extent by which the weight of the base is increased by the formation of the salt, requires a corresponding increase in the amount of material needed to produce a given neuropharmacological effect.

The animal screening tests have been conducted on the racemic forms of all the foregoing benzomorphans (VIII) and on the pure levo- and dextro-isomers, where R is OH and $R_1$ is either $CH_3$ or $CH_2CH_2Ph$. The most practicable synthesis for these benzomorphans produces one racemate predominantly and a diastereoisomer (about $C_9$) in very low yield; both have been tested in animals.

In the mouse screening tests (see below) the analgesic activity ($ED_{50}$) and acute toxicity ($LD_{50}$) have been determined in accordance with J. Pharmacol. & Exptl. Therap., 107, 385 (1953), and are expressed in mg. of drug per kg. of mouse (subcutaneous administration unless otherwise specified). Morphine sulfate, codeine hydrochloride, and the most popular synthetic analgesic, meperidine hydrochloride (standard drugs for comparison) have, respectively, $ED_{50}$ 2.1, 14.2 and 9.9; and $LD_{50}$ 576, 270 and 155 when evaluated in this way. Occasionally, in the examples to follow, a compound's ability to block a conditioned response in mice and rats will be compared with that of the well-known tranquilizing drug chlorpromazine [2-chloro-3-(dimethylaminopropyl)-phenothiazine]hydrochloride.

The foregoing and other aspects and advantages of the present invention will be evident to those skilled in the art from the following examples of Table A in which Examples 1 and 2 refer to animal screening tests for analgesia and acute toxicity; Examples 3–5 refer to animal screening tests for the above factors and conditioned-response-blocking action; Examples 6–8 (similar to 3–5) employ different derivatives; Example 9 refers to animal screening for analgesia and acute toxicity of the minor racemate; and Examples 10–32 refer to clinical tests for analgesia, toxicity, and addictiveness of the phenethyl species of the predominant racemate. For convenience of reference, the data for these several examples is here summarized in Table A:

in the levo-form, the hydrochloride salt of which has an $ED_{30}$ of 0.11 and is 20 times as potent as morphine sulfate.

Table A

[Summary of examples of Neuropharmacological Activity, etc., of 2'-(R)-5,9-dimethyl-2-($R_1$)-6,7-benzomorphans.[3]]

| R | $R_1$ | Compound Code No. NIH | Examples, and form | | | Comment | |
|---|---|---|---|---|---|---|---|
| | | | ± | + | -- | $ED_{50}$ | $LD_{50}$ |
| Animal Screenings—Predom. Racemate and Optical Isomers thereof | | | | | | | |
| —H | —$CH_3$ | 7389 | 1 | | | 27.3 | 155 |
| —$OCH_3$ | —$CH_3$ | 7550 | 2 | | | 9.8 | |
| —OH | —$CH_3$ | [4] 7410 | 3 | | | [1] 3.0 | 175 |
| | | 7571 | | 4 | | | |
| | | 7569 | | | 5 | 1.7 | >400 |
| —OH | —$CH_2CH_2Ph$ | [5] 7519 | 6 | | | [2] 0.25 | 332 |
| | | 7614 | | 7 | | 6.7 | |
| | | 7613 | | | 8 | 0.11 | |
| Animal Screening—Minor Racemate | | | | | | | |
| —OH | —$CH_3$ | 7601 | 9 | | | 0.44 | 70 |
| Clinical Testing—Predominant Racemate | | | | | | | |
| —OH | —$CH_2CH_2Ph$ | 7519 | 10–19 | | | See Text | |
| | | 7519 | 20 | | | See Text | |
| | | 7519 | 21–32 | | | See Text | |

[1] Oral 23.9.
[2] Oral 6.4.
[3] Administered in inert carrier (see text following Example 22).
[4] This compound has been designated by the international nonproprietary name Metazocine, see 751 O.G. 1.
[5] This compound has been designated by the international nonproprietary name Phenazocine, see 751 O.G. 1.

Table A.—Examples 1 and 2

The predominant racemate of (±)-2,5,9-trimethyl-6,7-benzomorphan (I, R=H, $R_1$=$CH_3$) hydrochloride tested for analgesia by the hot-plate procedure (a modification of the Woolfe MacDonald method) had an $ED_{50}$ of 27.3; $LD_{50}$ 155. The 2'-methoxy analog (I, R=$CH_3O$, $R_1$=$CH_3$) had $ED_{50}$ 9.8 (no toxicity data available). Thus the latter is somewhat more potent than codeine, equivalent to merperidine.

Table A.—Examples 3, 4 and 5

The $ED_{50}$ and $LD_{50}$ for the predominant racemate of (±) - 2'-hydroxy-2,5,9-trimethyl-6,7-benzomorphan hydrochloride (I, R=OH, $R_1$=$CH_3$) determined as described above are 3.0 and 175 respectively. The oral $ED_{50}$ was 23.9. This compound was slightly more potent than chlorpromazine hydrochloride in blocking a conditioned response but showed physical dependence liability in the monkey comparable to morphine. The dextro-rotatory isomer was analgesically inert at a convulsant dose of 20 mg. of the hydrobromide salt per kg. while the levo form had $ED_{50}$ 1.7, $LD_{50}$ >400. Its thereapeutic ratio is superior to that of morphine sulfate.

Table A.—Examples 6, 7 and 8

As described above the $ED_{50}$ and $LD_{50}$ of the principal racemate of (±)-2'-hydroxy-5,9-dimethyl-2-phenethyl-6,7-benzomorphan-hydrochloride (I, R=OH, $R_1$=$CH_2CH_2Ph$)

were determined to be respectively, 0.25 and 332. Administered orally the $ED_{50}$ was 6.4. Its ability to block a conditioned response was some 15 times that of chlorpromazine hydrochloride. Its physical dependence property as assessed in the monkey was of a very low order at doses well above that for analgesia. Although the dextro isomer has pronounced analgesic effectiveness ($ED_{50}$ 6.7), the bulk of the activity is again contained

Table A.—Example 9

The minor diastereoisomer of (±)-2'-hydroxy-2,5,9-trimethyl-6,7-benzomorphan, as hydrochloride salt, (I, R=CH, $R_1$=$CH_3$) differing from the predominant isomer configuratively at $C_9$, has $ED_{50}$ 0.44, $LD_{50}$ 70, is therefore 7 times more potent than the predominant racemate (see Example 3) and nearly 5 times as active as morphine sulfate.

Table A.—Examples 10–19

The hydrobromide salt of the (±)- (I, R=CH, $R_1$=$CH_2CH_2Ph$) was administered parenterally to a moderate number of postoperative patients (original group of ten, confirmed in others). Satisfactory relief of pain was observed in doses of 1/10 the optimal dose of morphine sulfate 0.6 mg. equivalent to 6.0 mg. of morphine sulfate intravenously). There appeared to be less respiratory depression than is caused by an equally analgesic dose of morphine sulfate.

Table A.—Example 20

In one other case of severe root pain not relieved satisfactorily by other potent analgesics including morphine sulfate, 2 mg. of the hydrobromide of this (±)-I (R=OH, $R_1$=$CH_2CH_2Ph$) administered every 3 hours gave excellent relief of this otherwise intractable pain. After approximately 2½ weeks this patient apparently developed no tolerance, and no abstinence symptoms were evident.

Table A.—Example 21–32

(Lexington Addiction Studies)

The hydrobromide salt of (±)-I (R=OH, $R_1$=$CH_2CH_2Ph$) was administered subcutaneously to former morphine addicts. On the basis of graded single doses, effects like those of 20 mg. of morphine sulfate were obtained with a dose of 4 mg. (10 cases). Two subjects (one on a double-blind basis) received the drug four times a day for 21 days. The dose could be increased only to 36 mg. per day, whereas in the same time morphine sulfate dosage can be increased easily to 250 mg. per day. On abrupt withdrawal, abstinence symptoms were very mild in both patients compared with the severe syndrome noted on morphine withdrawal after a like period of administration. These results are consistent with the aforementioned findings in the monkey. There were no untoward toxic effects evident in any of the clinical experiences with this drug (Examples 10–32).

The above summarized data indicate that (—)-I R=OH, R$_1$=CH$_3$) of the predominant racemate series and the (±)-diastereoisomer (lesser racemate) are promising candidates for clinical use. It is also evident that (±)-I (R=OH, R$_1$=CH$_2$CH$_2$Ph) shows superior analgesic and tranquilizing action in animals and man with minimal deleterious side-actions including low addiction liability compared to presently-used, efficacious analgesic agents. It is possible that this compound and one or more of the others described above will also prove suitable for oral administration.

The drug as administered preferably comprises a suitable carrier for the benzomorphan. Thus for parenteral administration an aqueous solution of the benzomorphan in salt form may be employed, preferably buffered, as with sodium citrate, or the benzomorphan may be dissolved in propylene glycol and be then diluted with water or buffered aqueous solution to contain the desired dosage in a standard volume (say in ½ cc. of the solution). Preferably in the latter case the ultimate carrier solution comprises about 25% propylene glycol. In the above examples the drug comprised carrier as follows: Examples 1–5 and 9, aqueous; Examples 6–8, and 21–32 aqueous/pyropylene glycol about 75/23; Examples 10–20 aqueous, buffered with sodium citrate. The oral administration tests (in Examples 3 and 6) for convenience were made with the same solution employed in the subcutaneous tests in those examples, but obviously other known inert carriers for phamaceuticals, e.g. milk sugar, suspending fluids, etc., may be appropriately substituted for those employed, and the invention is not limited to any particular carrier.

It is to be understood that in the following claims, merely for the sake of brevity, the new compounds are defined in terms of the base, and that the claims are to be construed as covering not only the base compounds but also the salts of such compounds (e.g. the salts formed thereby with organic and inorganic acids, alkyl halides, etc.). It is further to be understood that because of nomenclature difficulties, when "methylene" is referred to in the following claims, such term is to be construed as including a single CH$_2$ group double bonded to C$_9$ whether or not said group is further substituted.

The invention described herein, if patented, may be manufactured and used by or for the Government of the United States for governmental purposes without the payment to me of any royalty thereon in accordance with the provisions of the Patent Act of 1952 (35 U.S.C. Sec. 266).

I claim:

1. A chemical compound of the class consisting of a free base and its nontoxic acid addition salts, the free base being an iso-2'-hydroxy-5,9-dimethyl-2-substituted-6,7-benzomorphan of the following formula:

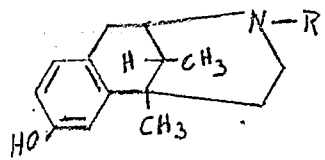

in which R is a member selected from the group consisting of hydrogen, methyl and phenylalkyl, said alkyl having from 1 to 4 carbons.

2. Iso - 2' - hydroxy-5,9-dimethyl-2-(β-phenethyl)-6,7-benzmorphan.

3. Iso-2'-hydroxy-5,9-dimethyl-6,7-benzmorphan.

4. Iso - 2' - hydroxy-5,9-dimethyl-2-(β-phenethyl)-6,7-benzmorphan hydrobromide.

5. Iso-2'-hydroxy-2,5,9-trimethyl-6,7-benzmorphan hydrochloride.

6. Iso-2'-acetoxy-2,5,9-trimethyl-6,7-benzmorphan.

7. A chemical compound of the class consisting of a free base and its nontoxic acid addition salts, the free base being a 2'-hydroxy-5,9-dimethyl-2-substituted-6,7-benzmorphan of the following formula:

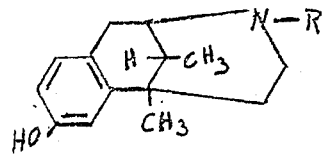

in which R is a member selected from the group consisting of hydrogen, methyl and phenylalkyl, said alkyl having from 1 to 4 carbons.

8. 2' - hydroxy-5,9-dimethyl-2-(β-phenethyl)-6,7-benzmorphan.

9. 2'-hydroxy-5,9-dimethyl-6,7-benzmorphan.

10. 2' - hydroxy-5,9-dimethyl-2-(β-phenethyl)-6,7-benzmorphan hydrobromide.

11. 2'-hydroxy-2,5,9-trimethyl-6,7-benzmorphan hydrochloride.

12. 2'-acetoxy-2,5,9-trimethyl-6,7-benzmorphan.

References Cited in the file of this patent

UNITED STATES PATENTS

| | | |
|---|---|---|
| 2,924,603 | Gordon et al. | Feb. 9, 1960 |
| 2,959,594 | Gordon et al. | Nov. 8, 1960 |

OTHER REFERENCES

May et al.: J. Org. Chem., vol. 20, pp. 257–263, Feb. 1955.

May et al: J. Organic Chem., vol. 22, pp. 1366–1369, Nov. 1957.

May et al.: J. Organic Chem., vol. 21, pp. 899–901, (1956).

Eddy et al.: J. Organic Chem., vol. 22, pp. 1370–1372, Nov. 1957.

Eddy et al.: J. Organic Chem., vol. 24, p. 294 (1959).

Grewe et al.: Chemische Berichte, p. 279–286 (1948).